UNITED STATES PATENT OFFICE.

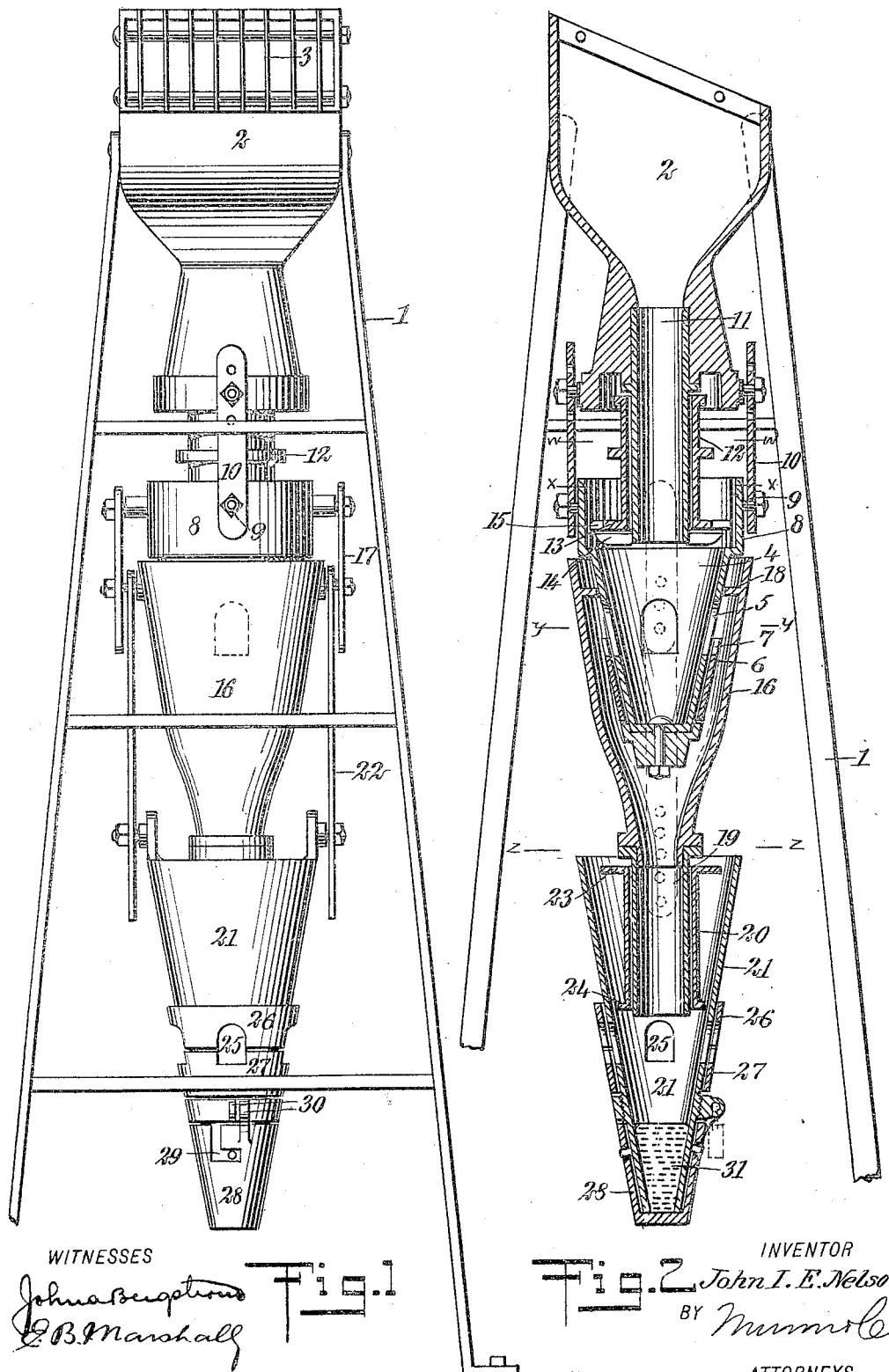

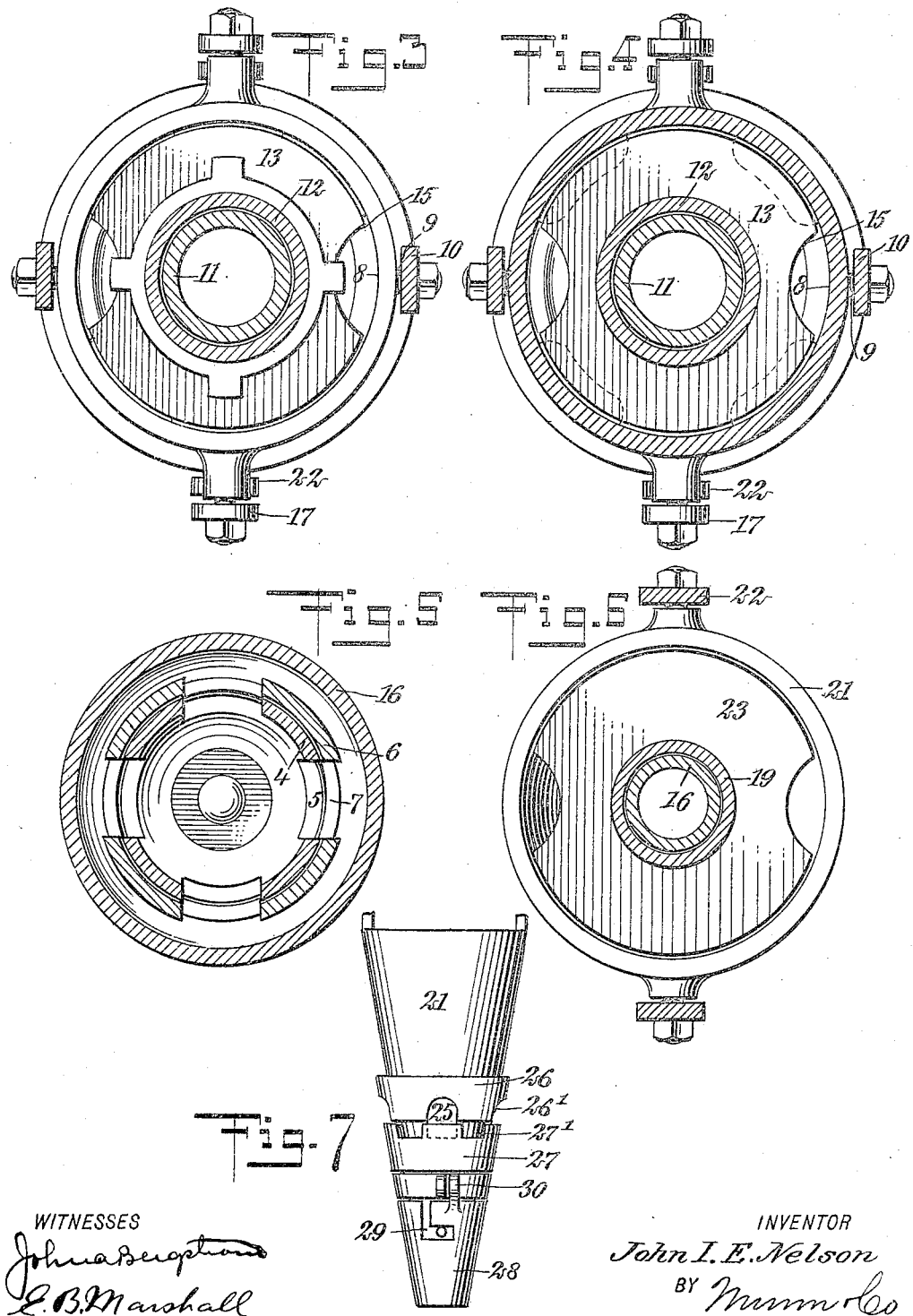

JOHN I. E. NELSON, OF BETTLES, DISTRICT OF ALASKA.

CONCENTRATOR AND AMALGAMATOR.

942,584.          Specification of Letters Patent.      Patented Dec. 7, 1909.

Application filed October 24, 1908. Serial No. 459,280.

*To all whom it may concern:*

Be it known that I, JOHN I. E. NELSON, a citizen of the United States, and a resident of Bettles, Koyukuk Mining District, in the District of Alaska, have invented a new and Improved Concentrator and Amalgamator, of which the following is a full, clear, and exact description.

My invention relates to concentrators and amalgamators and has for its object to provide means by which fine gold is saved in placer mining, without concentration. This I do by leading the current with the gold and foreign matter down perpendicularly into a mixer, in which there may be some concentration but which serves principally to mix thoroughly the sand or other foreign matter and the gold with the water, and to return them against the current through ports which may be regulated as to size to suit different conditions, the sand, water and gold passing through the ports to the amalgamator, in the bottom of which there is quicksilver, there being ports in the upper walls of the amalgamator, the size and the height of the openings in the ports being regulated by valves. The sand, gold and water fall on the quicksilver, with which the gold becomes mingled in the eddy of the current, as the water and the sand pass upwardly against the current through the ports in the sides of the amalgamator, The distance between the hopper and the mixer and the distance between the mixer and the amalgamator, may be regulated as desired.

In this specification I will describe the preferred form of my invention, but it will be understood that I do not limit myself thereto as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a side elevation of the invention; Fig. 2 is a longitudinal sectional view of Fig. 1; Fig. 3 is an enlarged sectional view on the line *w—w* of Fig. 2; Fig. 4 is an enlarged sectional view on the line *x—x* of Fig. 2; Fig. 5 is an enlarged sectional view on the line *y—y* of Fig. 2; Fig. 6 is an enlarged sectional view on the line *z—z* of Fig. 2; and Fig. 7 is a side elevation of the amalgamator, the arrangement for regulating the size and the height of the openings in the parts being shown.

By referring to the drawings, it will be seen that the device is supported by means of a frame 1, a hopper 2 being secured to the frame, the said hopper having a screen 3 through which the sand or other matter containing the gold may be thrown, together with the current of water. Supported below the hopper 2 is a mixer 4 in which there are ports 5 the size of which are regulated by valves 6. As shown in the drawings this mixer 4 decreases in diameter toward its bottom or is frusto-conical in shape and the valve 6 is similarly constructed and is pivoted to the mixer 4 at its bottom. The valve 6 does not extend high enough to at any time completely cover the ports 5, but it extends above the lower portions of the said ports 5, there being cut-away portions 7 in the valve so that it may be rotated, and the cut-away portions 7 will register with the lower portions of the ports 5 so that the said ports will be completely open. This arrangement enables the operator to not only decrease the openings in the said ports 5, but at the same time to have the upper parts of the ports wholly unobstructed. The mixer 4 has an upwardly extending annular rim 8, with studs or bolts 9 therein, to which links 10 are secured, the said links being also secured to the hopper 2, thereby serving to support the mixer 4. A pipe 11 extends downwardly from the hopper 2 into the mixer 4, and on this pipe 11 is disposed a collar 12, this collar being adapted to slide on the pipe 11 to extend it when it is desired to dispose the mixer 4 at a greater distance from the hopper 2 than the position shown in the drawings. At the bottom of the collar 12 there is a flange 13, this flange being adapted to contact with lugs 14 which are disposed on the inner face of the mixer 4. It will thus be seen that when the position of the mixer 4 is changed so that it is at a greater distance from the hopper 2 than as shown in the drawings, the collar 12 will automatically fall, thereby continuing the pipe 11 until the flange 13 on the said collar 12 abuts against the lugs 14. Cut-away portions 15 may be made in the flange 13, to make certain that the flange will pass the inner projections of the bolts or studs 9. The body of the mixer 4 is disposed in a frusto-conical communication 16, the said communication 16 being supported by means of links 17, which are secured to the said frusto-conical communication and to the mixer 4. The said communication 16 has an interior annular flange 18, which is adapted to abut against the exterior of the mixer 4 just above the ports 5. The communication 16 leads to and is secured to a pipe 19, on which is disposed a collar 20. This pipe 19 with its collar 20 is disposed in the amalgamator 21, the amalgamator 21 being supported by the links 22 which are secured to it and to the communication 16. The collar 20 has a flange 23 at its top and a flange 24 at its bottom, these flanges 23 and 24 being adapted to abut against the inner surface of the amalgamator 21, which is frusto-conical in shape, so that the amalgamator 21 may be disposed at varying distances below the mixer 4, with the assurance that the collar 20 will at all times form a continuation of the pipe 19, so that a direct communication may be obtained between the mixer 4 and the amalgamator 21 by means of the member 16. The amalgamator 21 has a plurality of ports 25 therein, and it has two collars 26 and 27, these collars being so constructed as to fit close against the exterior of the amalgamator 21, and each collar has openings therein which are adapted to close portions of the ports 25 over which the collars 26 and 27 are disposed. By the rotation of the collar 26, the size of the opening at the top of the ports 25 may be regulated, and by the rotation of the collar 27 the size of the opening at the bottom of the ports 25 may also be regulated. A cap 28 is adapted to fit over the bottom of the amalgamator 21, and it is secured to the amalgamator by means of bayonet joints 29. When in place, the cap 28 may be locked to the amalgamator by passing a padlock in the openings of the lugs 30 on the amalgamator, as shown in Fig. 2. The bottom of the amalgamator 21 is adapted to contain quicksilver 31.

In using my invention, the quicksilver is deposited in the bottom of the amalgamator, and the relative distances between the hopper 2 and the mixer 4 and between the mixer 4 and the amalgamator 21, are determined, and the supports for the mixer 4 and the amalgamator are adjusted. Sand containing the gold, and a column of water, are then led into the hopper 2, and will flow through the pipe 11 into the mixer 4, and fall against the bottom of the mixer and will be forced upward through the ports 5 by the pressure. The height of the openings in these ports 5 may be regulated, as stated, by means of the valves 6. It may be that there will be some concentration in the bottom of the mixer 4, but, as stated above, the principal object of the mixer is to see that the sand with the gold is suspended evenly in the water, so that when it passes through the ports 5, it will fall in this condition through the communication 16, the pipe 19 and into the amalgamator 21 on to the quicksilver 31 which the amalgamator 21 contains. The particles of the gold will intermingle with the quicksilver, while the water with the sand and foreign matter will be driven upwardly and out through the ports 25, the openings in the said ports 25 and their height being regulated by means of the collars 26 and 27, which have openings therein and act as valves.

Having thus described my invention, I claim as new and desire to secure by Letters Patent:

1. In an amalgamator, a receptacle which is adapted to contain quicksilver, there being a port in the wall of the receptacle, and a valve consisting of a plurality of sections adapted to move independently of each other to close the said port, there being an opening in each of the said sections of the valve.

2. In an amalgamator, a receptacle having an annular periphery, there being a port in the wall of the receptacle, and a collar disposed around the receptacle over a portion of the port adapted to be rotated relatively to the receptacle, there being a cut-away portion in the collar so that the port will be opened wider when the collar is rotated to a position where the cut-away portion registers with the port.

3. In an amalgamator, a receptacle which is adapted to contain quicksilver in its bottom, there being a port in the wall of the receptacle, a deep mixing chamber having an inclosed bottom, there being a port in the wall of the mixing chamber at a distance from its bottom, a valve consisting of a plurality of sections adapted to move independently of each other to control the port in the wall of the mixing chamber, a pipe adapted to convey material into the top of the mixing chamber, the diameter of the pipe being substantially as great as the area of the bottom of the mixing chamber, and communicating means connecting the port in the mixing chamber with the receptacle.

4. In an amalgamator, a receptacle which is adapted to contain quicksilver in its bottom, there being a port in the wall of the receptacle, a deep mixing chamber, the sides of which converge toward its bottom, which is inclosed, there being a port in the wall of the mixing chamber at a distance from its bottom, a valve consisting of a plurality of sections adapted to move independently of each other to close the port in the mixing chamber, a pipe adapted to convey material to the mixing chamber, the axis of the pipe being substantially in alinement with the center of the bottom of the mixing chamber, and communicating means connecting the port in the mixing chamber with the receptacle.

5. In an amalgamator, a receptacle, which is adapted to contain silver, there being a port in the wall of the receptacle, a deep mixing chamber converging toward its bottom, there being a port in the wall of the mixing chamber, a communicating means converging downward in which the mixing chamber is disposed and is spaced therefrom, the communicating means leading into the receptacle, studs on the receptacle, mixing chamber and communicating means respectively, links secured to the studs by which the communicating means and the receptacle are supported, a hopper, studs on the hopper, links secured to the last named studs and to studs on the mixing chamber by which the mixing chamber is supported, a pipe leading from the hopper to the mixing chamber, a collar mounted on the pipe, a flange on the collar, flanges in the mixing chamber with which the first named flanges are adapted to engage, and means to support the hopper.

In testimony whereof I have signed my name to this specification in the presence of two subscribing witnesses.

JOHN I. E. NELSON.

Witnesses:
J. S. HARDING,
CHARLES DREIBELBIS.